United States Patent Office 3,113,073
Patented Dec. 3, 1963

3,113,073
SOLUTIONS OF BENZOQUINONE DERIVATIVES
Wayne M. Grim, Meadowbrook Chalfont, Pa., assignor to Merck & Co., Inc., Rahway, N.J., a corporation of New Jersey
No Drawing. Filed Mar. 6, 1961, Ser. No. 93,310
10 Claims. (Cl. 167—58)

This invention relates to pharmaceutical formulations. More particularly, it relates to stable aqueous compositions of 2,3-di-substituted-5-lower alkyl benzoquinones containing unsaturated isoprenoid substituents in the 6-position which are suitable for parenteral administration and to a method of preparing the same.

It has heretofore been found that Q-275, later called coenzyme $Q_{10}$, plays an important role in the biological oxidation system. In particular, the presence of coenzyme $Q_{10}$ appears to be correlated with succinate oxidizing capacity. Coenzyme $Q_{10}$ has been isolated from beef heart mitochondria and more recently has been made synthetically. It has been found to have the structural formula

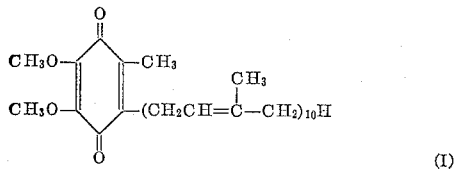

(I)

Still more recently, it has been found that other derivatives and analogues of coenzyme $Q_{10}$ such as those represented by the structural formula

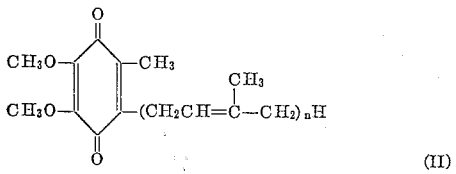

(II)

wherein $n$ is a whole integer from 1 to 10, possess similar properties and function in a manner analogous to that of coenzyme $Q_{10}$.

While the function of these compounds in the body is not fully understood at this time, it nevertheless appears that they are necessary in the metabolic process. Normally, coenzyme $Q_{10}$ is present in the body in amounts sufficient to carry out the metabolic process. However, there are undoubtedly instances where the body does not contain, for various reasons, an amount of coenzyme $Q_{10}$ necessary for the proper functioning of the metabolic process. Since the preponderance of all the useful energy available to mammalian cells from food stuffs is dependent on the proper functioning of that portion of the metabolic process in which coenzyme $Q_{10}$ participates, it is believed that even a partial reduction in the efficiency of the process due to a deficiency of coenzyme $Q_{10}$ may cause severe effects such as occur in cellular deficiencies of niacin and riboflavin.

Accordingly, a great deal of research is being directed to ascertain a more precise definition of the role of coenzyme $Q_{10}$ and other related derivatives and analogues in the metabolic process. In furtherance of this objective, numerous attempts have been made to provide these compounds in the form of stable aqueous solutions suitable for parenteral administration since such solutions would be more desirable technically than oral preparations. Unfortunately, because of the virtual water-insolubility of these compounds, it has heretofore been impossible to prepare stable aqueous solutions of these compounds which would be suitable for parenteral administration. As a result, further research directed to determine the role these compounds play in the metabolic process has been substantially hindered.

According to the present invention, it has now been found that stable aqueous solutions of coenzyme $Q_{10}$ and various other derivatives and analogues thereof, can be prepared by dissolving these compound in a two component solubilizing system comprised of (1) the condensation product of castor oil and ethylene oxide and (2) a water-miscible amide, and adding the resulting mixture to water. Such compositions have the properties and characteristics which render them highly adaptable for parenteral administration, particularly intravenous injection. Thus, it has been found that aqueous solutions containing relatively high concentrations of the compounds represented by Formula II can be prepared in the manner described above. For example, coenzyme $Q_{10}$ concentrations of 10 mg. or more per ml. of solution can readily be obatined. Furthermore, it has been found that the two components comprising the solubilizing system, when administered parenterally in concentrations sufficient to provide useful aqueous parenteral solutions of coenzyme $Q_{10}$ and related compounds, are completely innocuous, nonhemolytic and non-irritating to tissue. As a result of the present invention there are now provided stable aqueous parenteral solutions of coenzyme $Q_{10}$ and related compounds which may be readily utilized by scientists in their attempts to more precisely define the role these compounds play in the metabolic process.

As previously indicated herein, the benzoquinones employed in the aqueous compositions of this invention are those represented by structural Formula II, appearing hereinabove. Illustrative of such compounds are 2,3-dimethoxy-5-methyl-6-geranylbenzoquinone, 2,3-dimethoxy-5-methyl-6-nerylbenzoquinone, 2,3 - dimethoxy-5-methyl-6-farnesylbenzoquinone, 2,3 - dimethoxy-5-methyl-6-(3'-methyl - 2' - butenyl)-benzoquinone, 2,3 - dimethoxy-5-methyl-6-(3',7'-11',15' - tetramethyl - 2',6',10',14' - hexadecatetraenyl)-benzoquinone, 2,3-dimethoxy-5-methyl-6-(3',7',11',15',10'-pentamethyl - 2',6',10',14',18' - eicosapentaenyl)-benzoquinone, 2,3-dimethoxy-5-methyl-6-(3',-7', 11', 15', 19', 23', 27', 31', - octamethyl - 2',6',10',14', 18',22',26',30'-dotriacontaoctaenyl) - benzoquinone and 2,3 - dimethoxy-5-methyl-6-(3',7',11',15',19',23',27',31',-35',39' - decamethyl - 2',6',10',14',18',22',26',30',34',38'-tetracontadecaenyl)-benzoquinone. These compounds may be prepared in the manner described in copending application, Serial No. 758,648, filed August 25, 1958, and assigned to Merck & Co., Inc., the same assignee of the present application.

The two component solubilizing system employed in the preparation of the aqueous solutions of this invention is, as previously mentioned, comprised of a mixture containing (1) the condensation product of castor oil and ethylene oxide and (2) a water-miscible amide. With respect to the condensation product, it has been found that satisfactory condensation products are those which contain from about 20 to about 40 moles of ethylene oxide per mole of castor oil. However, castor oil-ethylene oxide condensation products containing from about 30 to about 35 moles of ethylene oxide per mole of castor oil are particularly effective and preferred. Such condensation products may be readily prepared in the manner described in German Patent No. 694,178, published July 27, 1940. A number of these products are available commercially from the General Aniline & Film Corporation under the name "Emulphor," e.g., Emulphor EL–620 and Emulphor EL–719 and from the Process Chemical Company under the name "Prosol," such as, for example, Prosol E–4329.

The water-miscible amides which comprise the second component of the solubilizing system are those represented by the structural formula

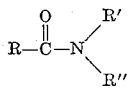

wherein R is a hydrogen or methyl radical, R' is a hydrogen or alkyl radical containing no more than 2 carbon atoms and R'' is an alkyl radical containing no more than 2 carbon atoms. In the above formula where R' and R'' are both alkyl radicals, it is preferred that they be the same. Illustrative of the water-miscible amides which may be utilized in the preparation of the solutions of the present invention are N,N-dimethyl formamide, N-methyl formamide, N-ethyl acetamide, N,N-diethyl acetamide and N,N-dimethyl acetamide. However, the preferred amides are N-methyl formamide and N,N-dimethyl acetamide.

It is essential that both of the above-mentioned components be utilized in the preparation of the solutions of this invention. If either component is employed alone stable aqueous solutions of the benzoquinones are not obtained.

In the preparation of the aqueous solutions of this invention, the substituted benzoquinones may be dissolved in a previously prepared mixture of the condensation product and amide or alternatively the benzoquinone may first be dissolved in either one of the components and the other added thereafter. However, it is essential that solubilization of the benzoquinone in the solvent system be complete before the addition of any water. After solution is complete, water is then slowly added maintaining good agitation until the final concentration of the benzoquinone in the aqueous solution is obtained.

The amount of condensation product employed in the preparations of this invention will, of course, vary depending on such factors as the particular benzoquinone and condensation product employed as well as the concentration of benzoquinone desired in the final solution. However, in general, it has been found that satisfactory results are obtained when from about 5 mg. to about 25 mg. and perferably from about 7 mg. to about 15 mg. of the condensation product per mg. of benzoquinone is employed. Aqueous benzoquinone solutions prepared as described above and containing from about 5% to about 25% of the condensation product (weight/volume) are highly satisfactory for parenteral administration. However, solutions containing from about 7% to about 15% of the condensation product are preferred.

It is to be noted that although the above ranges represent practical limits, the ratio of condensation product to benzoquinone, as well as the final concentration of condensation product in solution, may be increased somewhat but some difficulties may be encountered in administering such solutions because of increased viscosity.

The amount of water-miscible amide employed in the preparations of the present invention will also vary depending upon the particular amide employed as well as such other factors as enumerated above. However, it is essential that the amount employed be sufficient to provide a concentration of at least 1.0% by volume of the total solution and desirably is in the range of from about 1.0% to about 7.5%. Preferably, the concentration of amide is in the range of from about 3.5% to about 5.5% by volume of the total solution.

The aqueous solutions of this invention are as mentioned above highly suitable for parenteral administration, particularly intravenous injection. In such usage, the solutions may, in addition to the above-mentioned ingredients, contain other water-soluble ingredients such as saline, glucose, sucrose, dextrose and the like.

In addition, to guard against bacterial decomposition of the benzoquinone in solutions to be packaged in multiple dose containers, it is desirable to incorporate a preservative in such solutions. Suitable preservatives include phenylmercuric acetate, phenylmercuric chloride, phenylmercuric nitrate and merthiolate. However, where such solutions are to be packaged in single dose containers, the addition of a preservative is not necessary but may be employed if desired. Where the addition of a preservative is desired, it is normally not necessary to employ a preservative in an excess of 1.0% (weight/volume) of the solution. With the more effective preservatives concentrations as low as 0.005% (weight/volume) are satisfactory.

Since the aqueous solutions of this invention are intended for parenteral administration, it will be understood that appropriate steps should be taken to insure that the products are sterile and also that they are free of pyrogens. In this connection, sterilization can be readily effected by aseptic filtration or autoclaving. As for the control of pyrogen content, this is best carried out by employing pyrogen-free components and carrying out he preparation under essentially pyrogen-free conditions.

The following examples are included for the purpose of illustration and are not to be construed as any undue limitation of the scope of the appended claims.

*Example 1*

An aqueous solution suitable for parenteral administration and having the following composition is prepared as follows:

Concentration per ml.
Coenzyme $Q_{10}$ _____ mg__ 10
Emulphor EL–620 _____ mg__ 100
N,N-dimethylacetamide _____ ml__ 0.05
Distilled water, q.s.

The coenzyme $Q_{10}$ is dissolved in a mixture of the Emulphor EL–620 and N,N-dimethylacetamide. Emulphor EL–620 is the condensation product of castor oil and ethylene oxide and contains about 34 moles of ethylene oxide per mole of castor oil. After solution is complete, water is added slowly maintaining good agitation. The resulting solution is then sterilized by aseptic filtration and subdivided into suitable vials for immediate use.

*Example 2*

An aqueous solution having the following composition is prepared as follows:

Concentration per ml.
Coenzyme $Q_{10}$ _____ mg__ 10
Emulphor EL–620 _____ mg__ 100
N,N-dimethylacetamide _____ ml__ 0.05
Merthiolate _____ mg__ 0.04
Distilled water, q.s.

The coenzyme $Q_{10}$ is dissolved in the Emulphor EL–620 and the N,N-dimethylacetamide is then added. To the resulting solution is added the merthiolate which is previously dissolved in distilled water. The resulting solution is then diluted to volume, sterilized by aseptic filtration and subdivided into suitable vials.

*Example 3*

An aqueous parenteral solution having the following composition is prepared as follows:

Concentration per ml.
Coenzyme $Q_{10}$ _____ mg__ 10
Emulphor EL–620 _____ mg__ 100
N,N-dimethylacetamide _____ ml__ 0.05
Merthiolate _____ mg__ 0.04
Dextrose _____ mg__ 50.0
Distilled water, q.s.

The coenzyme $Q_{10}$ is dissolved in the Emulphor EL–620 and the N,N-dimethylacetamide is then added. To the resulting solution is added the merthiolate and dextrose which are previously dissolved in distilled water. The resulting solution is then diluted to volume, sterilized by aseptic filtration and subdivided into suitable vials.

Example 4

An aqueous parenteral solution having the following composition is prepared according to the process of Example 1:

| | Concentration per ml. |
|---|---|
| Coenzyme $Q_{10}$ | mg__ 10 |
| Emulphor EL–719 | mg__ 100 |
| N,N-dimethylacetamide | ml__ 0.05 |
| Distilled water, q.s. | |

Emulphor EL–719 is the condensation product of castor oil and ethylene oxide and contains about 40 moles of ethylene oxide per mole of castor oil.

Example 5

An aqueous parenteral solution having the following composition is prepared according to the process of Example 1:

| | Concentration per ml. |
|---|---|
| Coenzyme $Q_{10}$ | mg__ 10 |
| Prosol E–4329 | mg__ 100 |
| N,N-dimethylacetamide | ml__ 0.05 |
| Distilled water, q.s. | |

Prosol E–4329 is the condensation product of castor oil and ethylene oxide and contains about 30 moles of ethylene oxide per mole of castor oil.

Example 6

An aqueous parenteral solution having the following composition is prepared according to the process of Example 3:

| | Concentration per ml. |
|---|---|
| Coenzyme $Q_{10}$ | mg__ 10 |
| Emulphor EL–620 | mg__ 75 |
| N,N-dimethylacetamide | ml__ 0.05 |
| Merthiolate | mg__ 0.04 |
| Dextrose | mg__ 50.0 |
| Distilled water, q.s. | |

Example 7

An aqueous parenteral solution having the following composition is prepared according to the process of Example 1:

| | Concentration per ml. |
|---|---|
| Coenzyme $Q_1$ 2,3-dimethoxy-5-methyl-6-(3'-methyl-2'-butenyl) benzoquinone | mg__ 10 |
| Emulphor EL–620 | mg__ 100 |
| N,N-dimethylacetamide | ml__ 0.05 |
| Distilled water, q.s. | |

Example 8

An aqueous parenteral solution having the following composition is prepared according to the process of Example 1:

| | Concentration per ml. |
|---|---|
| Coenzyme $Q_5$ 2,3-dimethoxy-5-methyl-6-(3',7',11',15',19' - pentamethyl - 2',6',10',14',18' - eicosapentaenyl) benzoquinone | mg__ 10 |
| Emulphor EL–620 | mg__ 100 |
| N,N-dimethylacetamide | ml__ 0.05 |
| Distilled water, q.s. | |

Various changes and modifications of the invention can be made, and to the extent that such variations incorporate the spirit of the instant invention, they are intended to be included within the scope of the appended claims.

I claim:

1. A composition comprising a substituted benzoquinone dissolved in an aqueous solution containing (1) a condensation product of castor oil and ethylene oxide containing from about 20 to about 40 moles of ethylene oxide per mole of castor oil and (2) a water-miscible amide of the formula

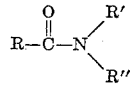

wherein R is selected from the group consisting of hydrogen and methyl radicals, R' is selected from the group consisting of hydrogen and alkyl radicals containing not more than 2 carbon atoms and R'' is an alkyl radical containing not more than 2 carbon atoms, said benzoquinone having the structural formula

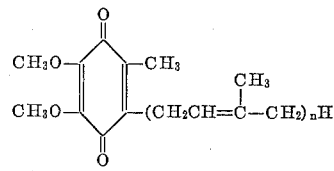

wherein $n$ is a whole integer from 1 to 10, inclusive.

2. The composition of claim 1 wherein the condensation product is present in an amount of at least 5 mg. per mg. of benzoquinone and the amide is present in an amount of at least 1.0% by volume.

3. The composition of claim 1 wherein the condensation product is present in an amount of from about 5 mg. to about 25 mg. per mg. of benzoquinone and the amide is present in an amount of at least 1.0% by volume.

4. The composition of claim 1 wherein the condensation product is present in an amount of from about 5 mg. to about 25 mg. per mg. of benzoquinone and the composition contains from about 5 to about 25% (weight/volume) of said condensation product and at least 1.0% by volume of the amide.

5. The composition of claim 4 wherein the condensation product contains from about 30 to about 35 moles of ethylene oxide per mole of castor oil.

6. A composition comprising a substituted benzoquinone dissolved in an aqueous solution containing (1) a condensation product of castor oil and ethylene oxide containing from about 30 to about 35 moles of ethylene oxide per mole of castor oil and (2) a water-miscible amide of the formula

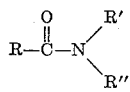

wherein R is selected from the group consisting of hydrogen and methyl radicals, R' is selected from the group consisting of hydrogen and alkyl radicals containing not more than 2 carbon atoms and R'' is an alkyl radical containing not more than 2 carbon atoms, said benzoquinone having the structural formula

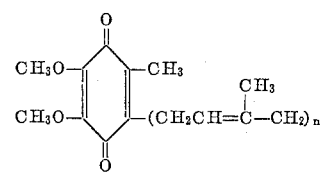

wherein $n$ is a whole integer from 1 to 10, inclusive, and being present in said aqueous solution in an amount of from about 7 mg. to about 15 mg. per mg. of said benzoquinone, said aqueous solution containing from about 7 to about 15% (weight/volume) of said condensation product and at least 1.0% by volume of said amide.

7. The composition of claim 6 wherein the amide is present in an amount of from about 1.0% to about 7.5% by volume.

8. The composition of claim 6 wherein the amide is present in an amount of from about 3.5% to about 5.5% by volume.

9. The composition of claim 8 wherein the substituted benzoquinone is 2,3-dimethoxy-5-methyl-6-(3',7',11',15', 19',23',27',31',35',39' - decamethyl - 2',6',10',14',18',22', 26',30',34',38'-tetracontadecaenyl)benzoquinone and the amide is N,N-dimethylacetamide.

10. A process for preparing aqueous solutions containing a substituted benzoquinone of the formula

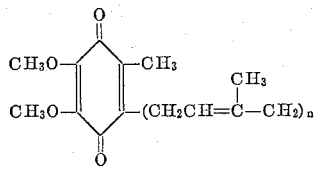

wherein $n$ is a whole integer from 1 to 10, inclusive, which comprises dissolving said benzoquinone in a two-component solubilizing system comprising (1) a condensation product of castor oil and ethylene oxide containing from about 20 to about 40 moles of ethylene oxide per mole of castor oil and (2) a water-miscible amide of the formula

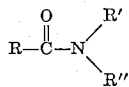

wherein R is selected from the group consisting of hydrogen and methyl radicals, R' is selected from the group consisting of hydrogen and alkyl radicals containing not more than 2 carbon atoms and R" is an alkyl radical containing not more than 2 carbon atoms, and combining the resulting solution with water to form an aqueous solution of said benzoquinone.

References Cited in the file of this patent
UNITED STATES PATENTS
3,008,876    Rhodes _____ Nov. 14, 1961

OTHER REFERENCES

Schwartz: Surface Active Agents, 1949, Interscience Publishers Inc., New York, N.Y., pp. 202 and 205.

Chemical Abstracts, 5th Decennial Index, vol. 41–50, Subject Index A–Az, p. 68S.